United States Patent [19]

Ditlya

[11] Patent Number: 5,155,654
[45] Date of Patent: Oct. 13, 1992

[54] VARIABLE ELECTRONIC COMPONENT

[75] Inventor: David Ditlya, Fair Lawn, N.J.

[73] Assignee: Voltronics Corporation, Denville, N.J.

[21] Appl. No.: 707,652

[22] Filed: May 30, 1991

[51] Int. Cl.5 .............................................. H01G 5/00
[52] U.S. Cl. .................................................. 361/287
[58] Field of Search ............... 361/277, 278, 287, 292, 361/293, 296, 282

[56] References Cited

U.S. PATENT DOCUMENTS

| | | | |
|---|---|---|---|
| 2,575,726 | 11/1951 | Peck | 361/282 |
| 3,679,940 | 7/1972 | Newman et al. | 361/296 |
| 3,701,932 | 10/1972 | Johanson | 361/293 |
| 3,757,266 | 9/1973 | Newman et al. | 338/158 |
| 4,575,779 | 3/1986 | Mittler et al. | 361/296 |
| 4,876,627 | 10/1989 | Mittler et al. | 361/293 |

Primary Examiner—Donald A. Griffin
Attorney, Agent, or Firm—Lerner, David, Littenberg, Krumholz & Mentlik

[57] ABSTRACT

A variable electronic component in the nature of a small sealed capacitor includes a pair of free floating dielectric plates disposed overlying a conductive body which is displaceable therebetween along a linear path. The conductive body is brought into varying degrees of overlapping registration with a conductive layer on the dielectric plates to vary the impedance characteristics of the capacitor between minimum and maximum values.

20 Claims, 3 Drawing Sheets

VARIABLE ELECTRONIC COMPONENT

BACKGROUND OF THE INVENTION

The present invention relates in general to a variable electronic component, and more particularly, to a sealed, variable trimmer capacitor adapted to provide a high resolution operative range of impedance characteristics employing a pair of free-floating dielectric plates.

In the advancing technologies of computers, testing equipment, appliances and other fields, various types of hybrid electronic circuits, integrated electronic circuits, micro strip amplifiers, micro electronic systems and other electronic devices are being developed and which are being made on increasingly smaller scale and size than has been known heretofore. In accomplishing this end, these devices are generally mounted on small flat insulating bases known as substrates. These various devices incorporate or have formed therein or co-act with various types of electronic components such as inductors, capacitors, resistors, potentiometers, etc., which in turn must be as small as possible to meet the demands of the reduced scale or size of these devices.

The known miniature devices have reached their functional limit even with the best precision manufacturing techniques because certain elements of these devices cannot be reduced further at reasonable cost for commercially acceptable regularly usable devices. U.S. Pat. Nos. 3,679,940 and 3,757,266, which patents are assigned to the same assignee of the within invention, each disclose variable electronic components, such as capacitors and resistors, which are particularly adapted to meet and overcome the problems of these known devices by eliminating the area and mass of conventional mounting frames, tuning mechanisms and other elements heretofore used, and instead integrate the elements of these variable electronic components directly into the circuit. These components are primarily designed as low-profile structures exceedingly small in size, simple in construction, easily adjustable, reliable in operation, easily replaceable and reproducible in quantity without sacrificing uniformity or performance. However, these variable electronic components are not sealed within a housing, thus subjecting their elements to processing fluids used during the manufacture of the electronic circuits into which they are incorporated. Another variable capacitor of the very low resolution type, i.e., one-half turn resolution, and which is also unsealed is known from U.S. Pat. No. 3,701,932.

Owing to the exceedingly small size of these variable electronic components, the ability to provide a high resolution device and to readily adjust these components have likewise become exceedingly more difficult. These low resolution devices have been provided with an upturned tab to be engaged by a suitable adjustable tool, for example, a tweezer, so as to effect the desired operative range of impedance characteristics of the component. As these components become increasingly smaller in size, it can be appreciated that there is a need to provide a more accurate and reliable means of providing the requisite adjustment, as well as in providing their resolution. There has been known to include in these variable electronic components a rack and pinion assembly operable upon rotation by a miniature screw driver in order to facilitate their adjustment.

One variable electronic component which satisfies the aforementioned objective is known from U.S. Pat. No. 4,575,779, which patent is assigned to the same assignee of the within invention. This known variable electronic component is constructed specifically as a low resolution device to include an eccentric whose rotational motion imparts reciprocal movement to an impedance-varying member. The eccentric is operative by engagement with an implement such as a screw driver and the like. However, the elements of this variable electronic component are not contained within a sealed housing, and are therefore exposed to the environment which can effect the component's impedance characteristics due to corrosion and other such action over time.

One variable electronic component which is contained within a sealed housing is known from U.S. Pat. No. 4,876,627, which patent is assigned to the same assignee of the within invention. This known variable electronic component includes within the sealed housing a cylindrical rotor having an impedance varying portion in cooperative association with a dielectric plate to provide the desired range of impedance characteristics. The rotor includes a plurality of circumscribing teeth extending radially outward in meshed engagement with the threads of a rotatable worm gear. This design of the variable electronic component has proven difficult to manufacture due to difficulties resulting from the relatively small size of these components and their associated threads which require a certain degree of design tolerance during molding from plastic material to ensure accurate operation of the variable electronic component over its capacitance range.

Accordingly, it can be appreciated that there is an unsolved need for a sealed variable electronic component, such as a variable trimmer capacitor, which can provide a desired high resolution operative range of impedance characteristics quickly, simply and inexpensively by adjustment using a suitable implement such as a screw driver and the like.

SUMMARY OF THE INVENTION

It is broadly an object of the present invention to provide a variable electronic component which overcomes or avoids one or more of the foregoing disadvantages resulting from the above-mentioned known variable electronic components, and which fulfills the specific requirements of such a variable electronic component for use in subminiature electronic circuits such as those disposed on a supporting substrate. Specifically, one aspect of the present invention provides a variable electronic component which includes sealed elements which facilitates the adjustment of the component to provide a desired high resolution operative range of impedance characteristics.

Another object of the present invention is to provide a variable electronic component particularly adapted for use in high-frequency subminiature electronic systems and devices.

Another object of the present invention is to provide a variable electronic component which is relatively easy to adjust to provide fine high resolution linear tuning for the electronic circuit for which it will be used.

Another object of the present invention is to provide a variable electronic component which is provided within a sealed housing to protect the components from moisture, liquids and other contaminants and processing fluids.

Another object of the present invention is to provide a variable electronic component that is readily adaptable for surface mounting on printed circuit boards.

Another object of the present invention is to provide a variable electronic component that maintains precision capacitance during shock and vibration of the electronic equipment into which it is installed.

Another object of the present invention is to provide a variable electronic component which effectively eliminates the stray unwanted capacitance.

Another object of the present invention is to provide a variable electronic component that has a high capacitance range for the size of the housing.

In accordance with one embodiment of the present invention, there is provided a variable electronic component constructed of a housing, a conductive member within the housing having spaced apart first and second contact portions, a rotatable member for displacing the conductive member along a linear path within the housing upon rotation of the rotatable member, a dielectric plate arranged overlying a portion of the first contact portion, first contact means for urging the dielectric plate into sliding contact with the first contact portion, and second contact means for slidingly engaging the second contact portion, whereby displacement of the conductive member along the linear path by rotation of the rotatable member varies the extent of the overlap between the dielectric plate and the first contact portion of the conductive member to provide a desired range of impedance characteristics to the component.

In accordance with another embodiment of the present invention, there is provided a variable electronic component constructed of a housing, a conductive member within the housing having parallel spaced apart surfaces, the first and second surfaces each having first and second spaced apart first and second contact portions, a rotatable threaded member in threaded engagement with the conductive member for displacing the conductive member along a linear path within the housing upon rotation of the rotatable member, a pair of dielectric plates respectively arranged overlying a portion of the first contact portions of the first and second surfaces, a first U-shaped contact member urging each of the dielectric plates into sliding contact with a respective one of the first contact portions of the first and second surfaces, and a second U-shaped contact member sliding engaging a respective one of the second contact portions of the first and second surfaces, whereby displacement of the conductive member along a linear path by rotation of the rotatable threaded member varies the extent of the overlap between the pair of dielectric plates and the first contact portions of the conductive member to provide a desired range of impedance characteristics to the component.

In accordance with another embodiment of the present invention, there is provided a variable electronic component constructed of a housing, a conductive member within the housing having parallel spaced apart surfaces, the first and second surfaces each having first and second spaced apart first and second contact portions, a rotatable threaded member in threaded engagement with the conductive member for displacing the conductive member along a linear path within the housing upon rotation of the rotatable member, a pair of dielectric plates respectively arranged overlying a portion of the first contact portions of the first and second surfaces, a first U-shaped contact member urging each of the dielectric plates into sliding contact with a respective one of the first contact portions of the first and second surfaces, and a second U-shaped contact member sliding engaging a respective one of the second contact portions of the first and second surfaces, a base receivable within the opening, the base having positioning means for positioning the first and second contacts and the pair of dielectric plates, whereby displacement of the conductive member along a linear path by rotation of the rotatable threaded member varies the extent of the overlap between the pair of dielectric plates and the first contact portions of the conductive member to provide a desired range of impedance characteristics to the component.

BRIEF DESCRIPTION OF THE DRAWINGS

The above description, as well as further objects, features and advantages of the present invention will be more fully understood with reference to the following detailed description of a variable electronic component, when taken in conjunction with the accompanying drawings, wherein.

DETAILED DESCRIPTION

Figure 1:
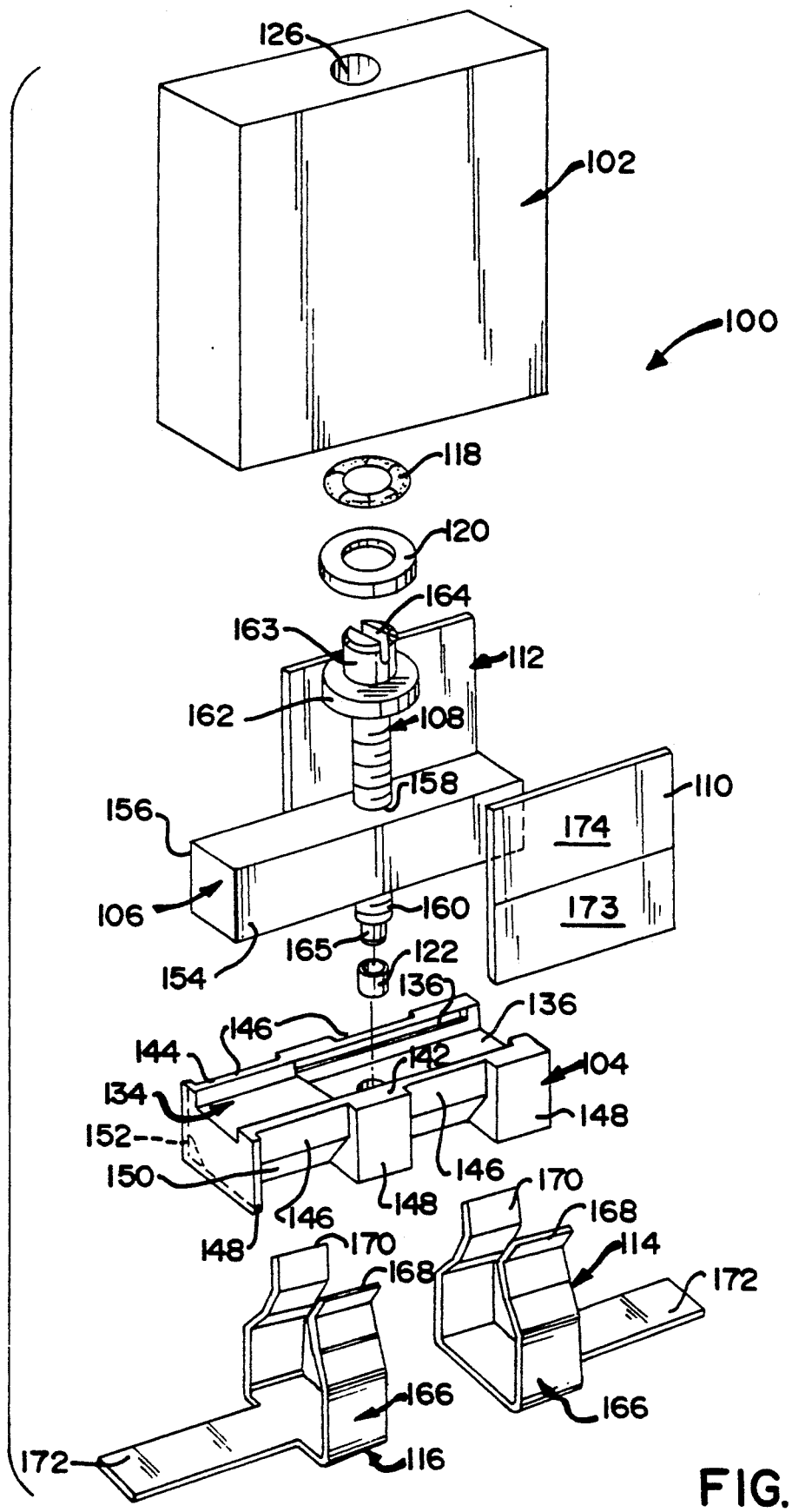
FIG. 1 is an enlarged exploded perspective view of an unassembled variable trimmer capacitor constructed in accordance with the present invention an showing the individual components thereof.

Referring to the drawings, wherein like reference numerals represent like elements, there is shown in FIG. 1 an unassembled variable electronic component in the nature of a variable trimmer capacitor generally designated by reference numeral 100, and constructed in accordance with the present invention. The trimmer capacitor 100 is primarily constructed of a housing 102, a housing base 104, a conductive member 106, a rotatable threaded member 108, a pair of dielectric plates 110, 112 and a pair of terminal contact members 114, 116. In addition, the trimmer capacitor 100 includes an O-ring 118, a stainless steel washer 120 and a metallic bearing 122.

Figure 3:
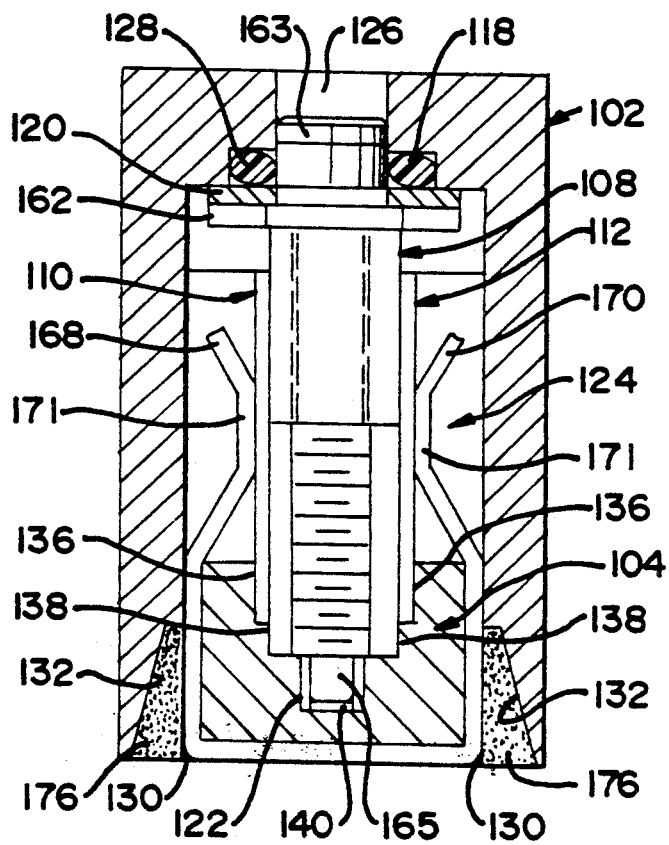
FIG. 3 is a cross-sectional view taken along line 3—3 in FIG. 2.

Referring generally to the drawings, the housing 102 is rectangular in shape having a configured hollow interior generally designated by reference numeral 124. As shown in FIG. 3, the housing 102 is provided with a bore 126 having an enlarged annular recess 128, both of which communicate with the interior 124 of the housing 102. The opposite end of the housing 102 is provided with an enlarged opening 130 formed by tapered side walls 132. As thus far described, the interior 124 of the housing 102 is configured to receive in assembled relationship the conductive member 106, the threaded member 108, the dielectric plates 110, 112, the terminal contact members 114, 116 and the base 104, as well as the O-ring 118, washer 120 and bearing 122.

The housing base 104 is generally rectangular in shape and having a configured hollow interior generally designated by reference numeral 134. The interior 104 is formed to include parallel spaced apart narrow rectangular dielectric plates receiving openings 136 communicating with a larger central rectangular shaped conductive member receiving opening 138 and a central bore 140. The hollow interior 134 is generally configured to receive the dielectric plates 110, 112, the conductive member 106 and a portion of the threaded member 108 in assembled relationship.

The base 102, along its opposing longitudinal side walls 142, 144, is provided with spaced apart cutout portions 146, as further pronounced by adjacent projecting ribs 148. The cut-out portions 146 receive and retain the terminal contact members 114, 116 to enable accurate positioning of the terminal contact members as they are being assembled about the base 104. In this regard, the base 104 is further provided with tapered lower side walls 150, 152 which facilitates the assembly of the terminal contact members 114, 116 about the base as to be described hereinafter with respect to the trimmer capacitor 100 in accordance with the present invention. The housing 102 and base 104 may be constructed from suitable plastic material such as polyphenylene sulfide resins, polyetherimide resins and the like.

The conductive member 106 is constructed generally as a rectangular body having parallel spaced apart opposing wall surfaces 154, 156 and a threaded centrally positioned through opening 158. The conductive member 106 is preferably constructed of metallic material, for example, brass, copper based alloys, beryllium-copper, phosphor bronze and the like. As it is only required that the wall surfaces 154, 156 be electrically conductive, the surfaces may comprise a metal deposited layer on the conductive member 106 which may be constructed of suitable plastic material. The conductive member 106 is preferably plated with an electrically conductive layer of copper, gold, silver or the like.

The threaded member 108 is constructed as a longitudinal cylindrical threaded body 160 for threaded engagement within the threaded opening 158 of the conductive member 106. One opposing end of the threaded body 160 is provided with a circular flange 162 and an enlarged head 163 having a transverse slot 164 adapted to receive the tip of a screwdriver or other such implement to effect rotation of the threaded member 108 as to be described hereinafter. The other opposing end of the threaded body 160 is formed as an unthreaded cylindrical projection 165 of reduced diameter. The threaded member 108 may be constructed from a variety of materials, such as stainless steel, plastic or the like.

The terminal contact members 114, 116 are constructed as a U-shaped member 166 including a pair of spaced apart legs 168, 170 planar electrical contact regions 171 and an outwardly extending depending member 172 defining an external contact terminal to the trimmer capacitor 100. The terminal contact members 114, 116 may be constructed from a variety of metals, such as copper based alloys, beryllium-copper, phosphor bronze or base metals plated with silver or gold.

The dielectric plates 110, 112 are generally of rectangular construction sized to be received within the dielectric plate receiving openings 136 within the base 104 so as to be positioned overlying a portion of the wall surfaces 154, 156 of the conductive member 106. The dielectric plates 110, 112 can be constructed from a variety of materials, for example, quartz, alumina (aluminum oxide), sapphire (aluminum oxide pure crystal), porcelain, dielectric resonator materials, barium titanate ceramics, plastics and the like. It should be understood that by changing the dielectric constant of the dielectric plates 110, 112, vis-a-vis the selected material, the capacitance range of the trimmer capacitor 100 may be predetermined as desired.

In accordance with one embodiment of the present invention, approximately one-half, i.e., top half or bottom half, of the outer surface 173 of the dielectric plates 110, 112 is coated with a conductive layer 174, e.g., a metallized layer such as silver frit, platinum, copper and the like. In addition, the conductive layer 174 applied to the outer surface 173 of the dielectric plates 110, 112 may be in the nature of a metal plated base alloy using thick or thin film technology.

Figure 4:
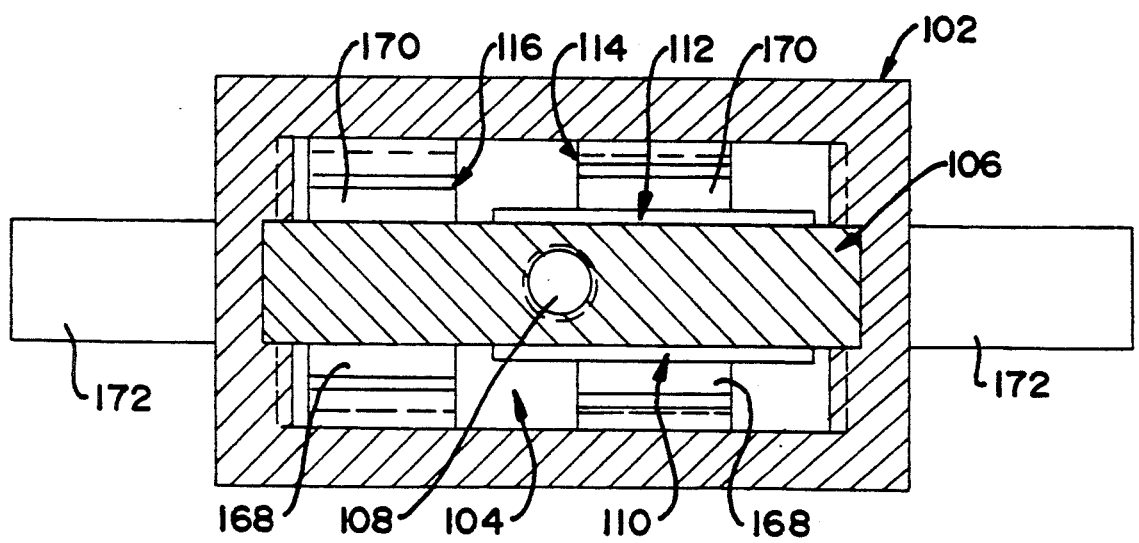
FIG. 4 is a cross-sectional view taken along line 4—4 in FIG. 2.

The assembly of the aforementioned components of the trimmer capacitor 100 will now be described with general reference to FIGS. 2-4. The conductive member 106 is rotatably mounted onto the threaded member 108 via threaded opening 158. Washer 120 is positioned on flange 162 of the threaded member 108 about head 163. O-ring 118 is positioned within the annular recess 128 of the housing 102 and metal bearing 122 is positioned within the bore 140 of the base 104. The dielectric plates 110, 112 are supported within opposing dielectric plate receiving openings 136 within the base 104 with their conductive layers 174 facing outward. The dielectric plates 110, 112 may be arranged such that the conductive layers 174 are either on the top or bottom half as to be described hereinafter.

The dielectric plates 110, 112 are maintained in spaced apart parallel relationship by positioning the conductive member 106 therebetween as best shown in FIG. 3. The cylindrical projection 165 of the threaded member 108 is received within the bearing 122 as positioned within the bore 140 of the base 104. As shown in FIG. 2, the dielectric plates 110, 112 are positioned overlying a portion of the opposing wall surfaces 154, 156 of the conductive member 106, i.e., a first contact portions. The dielectric plates 110, 112 by being unsecured are considered to be free floating. That is, the dielectric plates 110, 112 are allowed to move inwardly towards each other so as to make surface contact with the opposing wall surfaces 154, 156 of the conductive member 106.

The dielectric plates 110, 112, are maintained in proper registration and in aligned contact with the first contact portions of conductive member 106 by means of the dielectric plate receiving openings 136 as previously described and terminal contact member 114. To this end, the terminal contact member 114 is positioned about the base 104 in alignment with the cutout portion 146 defined between ribs 148. The terminal contact member 114 has its depending legs 168, 170 extending about and engaging the spaced apart dielectric plates 110, 112. The dimension between the free ends of legs 168, 170 at the electrical contact regions 171 is smaller than the distance between the outer surfaces 173 of the dielectric plates 110, 112. As a result, the terminal contact member 114 compresses each dielectric plate 110, 112 into surface contact with the opposing wall surfaces 154, 156 of the conductive member 106. Any air gap between the dielectric plates 110, 112 and the wall surfaces 154, 156 of the conductive member 106 is effectively eliminated which would otherwise cause potential variations in the capacitance of the trimmer capacitor 100 from time to time during operation.

More specifically, the electrical contact regions 171 of legs 168, 170 contact the dielectric plates 110, 112 over a central region. The electrical contact regions 171 engage the central region of the dielectric plates 110, 112 in a manner to provide stability to the dielectric plates 110, 112 during linear translation of the conductive member 106 between positions of minimum and maximum capacitance of the trimmer capacitor 100. In this regard, the electrical contact regions 171 of legs 168, 170 continuously oppose a portion of the conductive member 106 regardless of the position of the conductive member to prevent the dielectric plates 110, 112 from toeing inwardly as a result of their free-floating arrangement. In this regard, as shown, when the conductive member 106 is either at its maximum or minimum position, a portion of the electrical contact regions 171 maintain a force upon the dielectric plates 110, 112 in engagement with a portion of the conductive member. As such, there is an even and uniform force applied to the free floating dielectric plates 110, 112 to ensure uniform and constant surface contact between the dielectric plates and the wall surfaces 154, 156 of the conductive member 106 during linear movement thereof during adjustment and subsequently during use when installed in an electronic device.

The other terminal contact member 116 is similarly arranged about the base 104 being positioned in alignment by means of the cut-out portions 146 between adjacent ribs 148. The electrical contact regions 171 of the legs 168, 170 of the terminal contact member 116 are in direct sliding contact with portions, i.e., second contact portions, of the wall surface 154, 156 of the conductive member 106. Thus, the terminal contact members 114, 116 have four related functions, providing contact to the conductive member 106, providing compression to maintain contact with the conductive member 106, providing contact with the dielectric plates 110, 112 and providing terminals, i.e., depending members 172 to the electronic circuit in which the trimmer capacitor 100 is employed.

The trimmer capacitor 100, as thus far assembled, is received within the interior 124 of the housing 102 such that head 163 of the threaded member 108 extends into bore 126 and is circumferentially engaged by O-ring 118. In this manner, a fluid tight seal is created within the bore 126, while at the same time, allowing access to the slot 164 of the threaded member 108 to enable rotation thereof by means of a suitable implement such as a screwdriver and the like. As the printed circuit board to which the trimmer capacitor 100 is mounted will inevitably be subjected to process cleaning fluids and the like, it is highly desirable that the trimmer capacitor be completely sealed from the surrounding environment. To this end, a potting compound 176 such as epoxy or silicone is provided within the opening 130 of the housing 102 and surrounding the base 104.

Briefly, in operation, the tip of a screwdriver or other such implement is inserted within slot 164 to rotate the threaded member 108 about its longitudinal axis. As a result, the conductive member 106 is displaced between the dielectric plates 110, 112 along a linear path between the limits established by the base 104 and flange 162 of the threaded member 108. As shown in FIG. 3, the conductive layer 174 of the dielectric plates 110, 112 is arranged in the upper half of the interior 124 of the housing 102 closest to flange 162 of the threaded member 108. By arranging the conductive layer 174 within the upper portion of the housing 102, a number of advantages are achieved. For example, this arrangement results in a lower minimum capacitance achievable by the trimmer capacitor 100 to about 0.6 pF., which otherwise would be about 2.5 pF. for the same dielectric material and the conductive layers 174 arranged in the bottom half of the housing 102. In addition, it is found that the temperature coefficient of the trimmer capacitor 100 will be lower. The temperature coefficient is the measure of how much the capacitance changes when measured at extreme temperatures. Still further, the quality factor, i.e., the ratio of energy stored to energy dissipated, will be higher for the trimmer capacitor 100.

These advantages result by arranging the conductive layer 174 within the upper half of the housing 102 as the stray capacitance caused by the plastic parts, e.g., base 104, and the terminal contact members 114, 116 are not as extensively positioned within the active circuit of the trimmer capacitor 100 as would otherwise occur. Finally, the stresses caused by the expansion or contraction of the housing 102 and base 104 do not act directly on the conductive layer 174 of the dielectric plates 110, 112. However, it is to be understood that the conductive layer 174 of the dielectric plates 110, 112, may be arranged within the bottom half of the housing 102 adjacent the base 104 without departing from the present invention.

Figure 2:
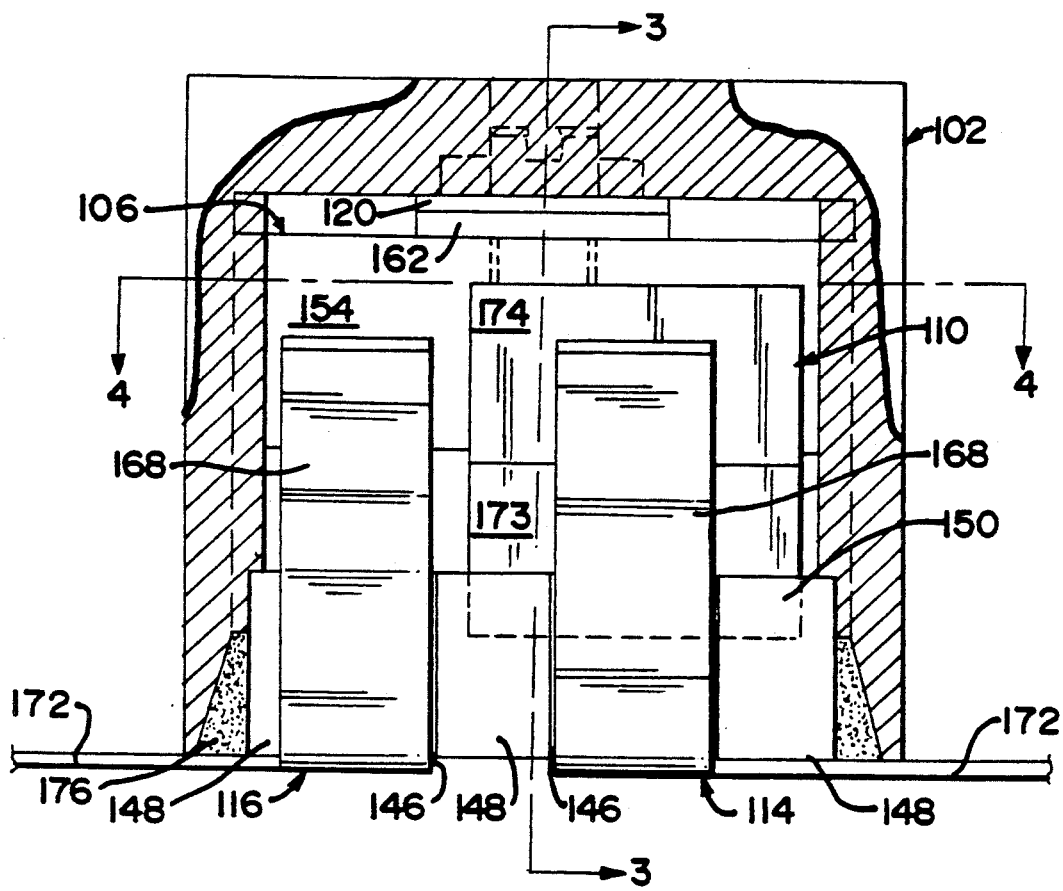
FIG. 2 is a front elevational view, in partial cross-section, showing the variable trimmer capacitor in assembled relationship.

As shown in FIGS. 2 and 3, the conductive layer 174 of the dielectric plates 110, 112, are in their maximum overlapping relationship with the conductive member 106. As a result, the trimmer capacitor 100 has its maximum rated capacitance. On the other hand, when the conductive member 106 is arranged in the position shown in Phantom, the conductive layer 174 of the dielectric plates 110, 112 are in their minimum overlapping relationship with the conductive member 106. This results in the trimmer capacitor 100 having its minimum rated capacitance.

As the rotatable member 108 is rotated, the capacitance of the trimmer capacitor 100 will vary from its minimum to maximum depending upon the percentage overlap between the conductive layer 174 of the dielectric plates 110, 112 and the conductive member 106. The number of threads on the rotatable member 108 determines the resolution of the trimmer capacitor 100. For example, the trimmer capacitor 100 may be made operative between its minimum and maximum capacitance in about nine to ten turns of the rotatable member 108.

Although the invention herein has been described with references to particular embodiments, it is to be understood that the embodiments are merely illustrative of the principles and application of the present invention. For example, only one dielectric plate may be used or, in another embodiment, a square design includes four dielectric plates and a square shaped sliding conductive member. It is therefore to be understood that numerous modifications may be made to the embodiments and that other arrangements may be devised without departing from the spirit and scope of the present invention as defined by the claims.

What is claimed is:

1. A variable electronic component comprising a housing, a conductive member within said housing having spaced apart first and second contact portions, a rotatable member for displacing said conductive member along a linear path within said housing upon rotation of said rotatable member, a dielectric plate arranged overlying a portion of said first contact portion, first contact means for urging said dielectric plate into sliding contact with said first contact portion, and second contact means for slidingly engaging said second contact portion, whereby displacement of said conductive member along said linear path by rotation of said rotatable member varies the extent of the overlap between said dielectric plate and said first contact portion of said conductive member to provide a desired range of impedance characteristics to said component.

2. The variable electronic component of claim wherein said housing is sealed to the surrounding environment and is constructed to have an internal configuration receiving said conductive member, said rotatable member, said dielectric plate, said first contact means and said second contact means in operative relationship.

3. The variable electronic component of claim 1, wherein said conductive member comprises a body having a first and second surface arranged in parallel spaced apart relationship, said first and second surfaces each having said first and second contact portions.

4. The variable electronic component of claim 3, wherein said body includes an opening for receiving in operative association therewith said rotatable member for displacing said body along a linear path within said housing.

5. The variable electronic component of claim 3, wherein said dielectric plate comprises a first dielectric plate, a portion of which having conductive properties, overlying said first contact portion of said first surface and a second dielectric plate, a portion of which having conductive properties, overlying said first contact portion of said second surface.

6. The variable electronic component of claim 5, wherein said first contact means comprises a U-shaped member having a pair of spaced apart legs respectively engaging said first and second plates.

7. The variable electronic component of claim 6, wherein said second contact means comprises a U-shaped member having a pair of spaced apart legs respectively engaging said second contact portion of said first and second surfaces adjacent said first and second plates.

8. The variable electronic component of claim 1, further including a base receivable within said housing, said base having positioning means about which said first and second contact means are received.

9. The variable electronic component of claim 8, wherein said positioning means comprise cut-out portions arranged along said base.

10. The variable electronic component of claim 1, wherein said rotatable member comprises a threaded shaft in threaded engagement with said conductive member.

11. A variable electronic component comprising a housing, a conductive member within said housing having parallel spaced apart first and second surfaces, said first and second surfaces each having spaced apart first and second contact portions, a rotatable threaded member in threaded engagement with said conductive member for displacing said conductive member along a linear path within said housing upon rotation of said rotatable threaded member, a pair of dielectric plates respectively arranged overlying a portion of said first contact portions of said first and second surfaces, a first U-shaped contact member urging each of said dielectric plates into sliding contact with a respective one of said first contact portions of said first and second surfaces, and a second U-shaped contact member sliding engaging a respective one of said second contact portions of said first and second surfaces, whereby displacement of said conductive member along a linear path by rotation of said rotatable threaded member varies the extent of the overlap between said pair of dielectric plates and said first contact portions of said conductive member to provide a desired range of impedance characteristics to said component.

12. The variable electronic component of claim 11, wherein said housing is sealed to the surrounding environment and is constructed to have an internal configuration receiving said conductive member, said rotatable threaded member, said pair of dielectric plates, said first U-shaped contact member and said second U-shaped contact member in operative relationship.

13. The variable electronic component of claim 11, wherein said dielectric plate comprise a first dielectric plate, a portion of which having conductive properties, overlying said first contact portion of said first surface and a second dielectric plate, a portion of which having conductive properties, overlying said first contact portion of said second surface.

14. The variable electronic component of claim 11, further including a base receivable within said housing, said base having positioning means about which said first and second U-shaped contact members are received.

15. The variable electronic component of claim 14, wherein said base includes a bore for receiving one end of said rotatable threaded member.

16. The variable electronic component of claim 11, further including a base receivable within said housing, said base having a pair of spaced apart openings for respectively receiving said pair of dielectric plates in aligned relationship.

17. A variable electronic component comprising a housing, a conductive member within said housing having parallel spaced apart first and second surfaces, said first and second surfaces each having spaced apart first and second contact portions, a rotatable threaded member in threaded engagement with said conductive member for displacing said conductive member along a linear path within said housing upon rotation of said rotatable threaded member, a pair of dielectric plates respectively arranged overlying a portion of said first contact portions of said first and second surfaces, a first U-shaped contact member urging each of said dielectric plates into sliding contact with a respective one of said first contact portions of said first and second surfaces, and a second U-shaped contact member sliding engaging a respective one of said second contact portions of said first and second surfaces, a base receivable within said housing, said base having positioning means for positioning said first and second U-shaped contact members and said pair of dielectric plates, whereby displacement of said conductive member along a linear path by rotation of said rotatable threaded member varies the extent of the overlap between said pair of dielectric plates and said first contact portions of said conductive member to provide a desired range of impedance characteristics to said component.

18. The variable electronic component of claim 17, wherein said housing is sealed to the surrounding environment and is constructed to have an internal configuration receiving said conductive member, said rotatable threaded member, said pair of dielectric plates, said first U-shaped contact member and said second U-shaped contact member in operative relationship.

19. The variable electronic component of claim 17, wherein said dielectric plates comprise a first dielectric plate, a portion of which having conductive properties, overlying said first contact portion of said first surface and a second dielectric plate, a portion of which having conductive properties, overlying said first contact portion of said second surface.

20. The variable electronic component of claim 17, further including sealing means for sealing said base within said housing.

* * * * *

UNITED STATES PATENT AND TRADEMARK OFFICE
CERTIFICATE OF CORRECTION

PATENT NO. : 5,155,654
DATED : October 13, 1992
INVENTOR(S) : David Ditlya

It is certified that error appears in the above-identified patent and that said Letters Patent is hereby corrected as shown below:

Column 4, line 24, "an" should read --and--.
Column 9, line 3, after "claim" insert --1--.

Signed and Sealed this

Fifth Day of October, 1993

Attest:

BRUCE LEHMAN

Attesting Officer

Commissioner of Patents and Trademarks